United States Patent
Gwak et al.

(10) Patent No.: US 8,218,023 B2
(45) Date of Patent: Jul. 10, 2012

(54) METHOD AND APPARATUS FOR PROCESSING CONTINUOUS IMAGE DATA CAPTURED BY DIGITAL IMAGE PROCESSOR

(75) Inventors: Jin-pyo Gwak, Suwon-si (KR); Dong-hyeon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 398 days.

(21) Appl. No.: 12/493,313

(22) Filed: Jun. 29, 2009

(65) Prior Publication Data

US 2010/0002092 A1 Jan. 7, 2010

(30) Foreign Application Priority Data

Jul. 7, 2008 (KR) ................ 10-2008-0065633

(51) Int. Cl.
*H04N 5/225* (2006.01)
*H04N 5/222* (2006.01)

(52) U.S. Cl. ............ 348/220.1; 348/333.05; 348/333.11

(58) Field of Classification Search ............... 348/220.1, 348/231.2, 333.02, 333.05, 333.11, 333.12; 386/210, 211, 220, 240, 284, 355
See application file for complete search history.

(56) References Cited

U.S. PATENT DOCUMENTS

| | | | |
|---|---|---|---|
| 2004/0005077 A1* | 1/2004 | Bilobrov et al. | 382/100 |
| 2007/0041448 A1* | 2/2007 | Miller et al. | 375/240.18 |
| 2009/0115872 A1* | 5/2009 | Lazaridis | 348/231.99 |

* cited by examiner

*Primary Examiner* — Lin Ye
*Assistant Examiner* — Euel Cowan
(74) *Attorney, Agent, or Firm* — Drinker Biddle & Reath LLP

(57) ABSTRACT

Provided are a method and apparatus for processing continuous image data captured by a digital image processor which encodes/decodes a plurality of continuous images in a Moving Picture Expert Group (MPEG) format. The apparatus includes a digital signal processing unit which compresses the continuous image data into video data in consideration of correlations between neighboring images, or converts the compressed video data into displayable data.

11 Claims, 7 Drawing Sheets

FIG. 5
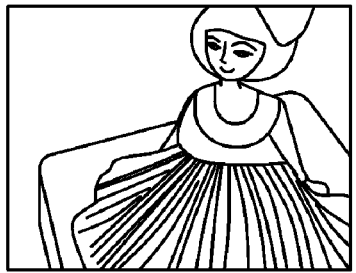
FRAME #1
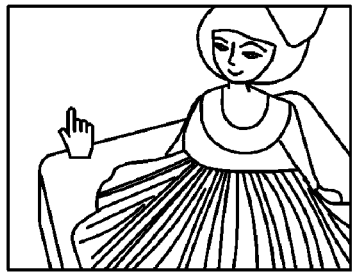
FRAME #2
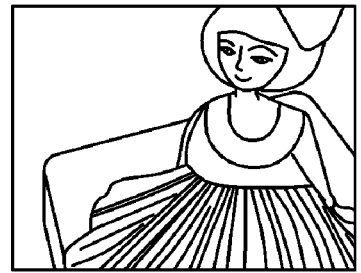
FRAME #3
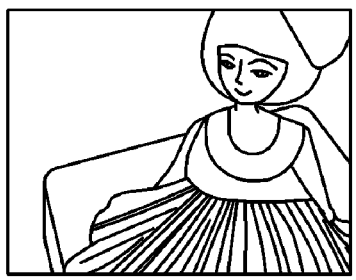
FRAME #4
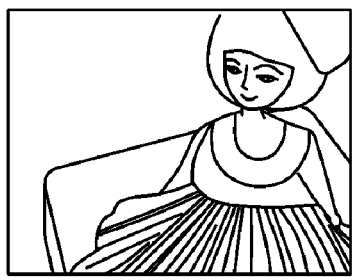
FRAME #5
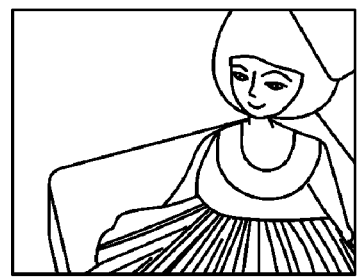
FRAME #6

FIG. 9
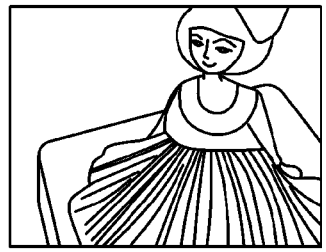
(1) CONTINUOUS IMAGE 1 (10 KB)
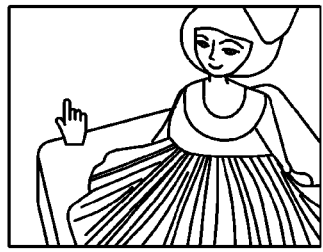
(2) CONTINUOUS IMAGE 2 (11 KB)
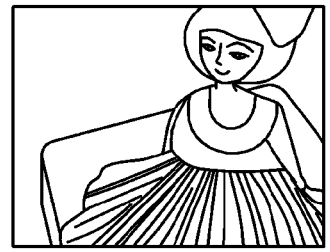
(3) CONTINUOUS IMAGE 3 (12 KB)
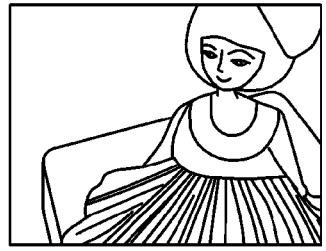
(4) CONTINUOUS IMAGE 4 (11 KB)
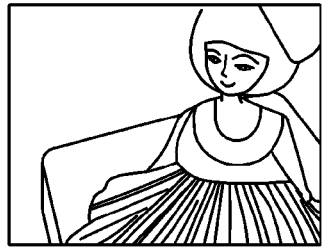
(5) CONTINUOUS IMAGE 5 (10 KB)
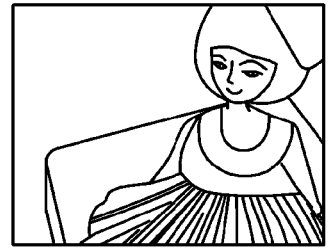
(6) CONTINUOUS IMAGE 6 (12 KB)
(CONVENTIONAL ART)

US 8,218,023 B2

METHOD AND APPARATUS FOR PROCESSING CONTINUOUS IMAGE DATA CAPTURED BY DIGITAL IMAGE PROCESSOR

CROSS-REFERENCE TO RELATED PATENT APPLICATION

This application claims the benefit of Korean Patent Application No. 10-2008-0065633, filed on Jul. 7, 2008 in the Korean Intellectual Property Office, the entire contents of which is incorporated herein in its entirety by reference.

BACKGROUND OF THE INVENTION

1. Field of the Invention

The present invention relates to a method and apparatus for processing digital image data, and more particularly, to a method and apparatus for processing continuous image data captured by a digital image processor which encodes/decodes a plurality of continuous images in a Moving Picture Expert Group (MPEG) format.

2. Description of the Related Art

The continuous shooting performance of general digital image processors is about 3 frame/sec. However, some digital image processors can support 10 frame/sec. or higher and the continuous shooting performance can be greatly improved if a complementary metal-oxide semiconductor (CMOS) sensor is used in the future. Thus, there is a need in the art to improve the performance of digital image processors to process the greater number of frames/sec generated in continuous shooting.

SUMMARY OF THE INVENTION

The present invention provides a method and apparatus for processing continuous image data captured by a digital image processor capable of improving compression performance by encoding/decoding a plurality of continuous images in a Moving Picture Expert Group (MPEG) format.

According to an aspect of the present invention, there is provided an apparatus for processing continuous image data captured by a digital image processor, the apparatus including a digital signal processing unit configured to compress the continuous image data using correlations between neighboring images, and configured to convert the compressed video data into displayable data.

The digital signal processing unit may include a data converter which converts the continuous image data into YCrCb (YCC) data; a Moving Picture Expert Group (MPEG) encoder which compresses the YCC data into MPEG data in consideration of correlations between neighboring images; an MPEG decoder which decodes the compressed MPEG data; and a video driver which processes the decoded data into a displayable signal.

Each of a plurality of frames of the continuous image data may be displayed as a still image.

If a user deletes a selected frame when the continuous image data is displayed, pseudo delete may be performed such that delete is only marked on a header of the selected frame and the selected frame is not actually deleted.

The digital signal processing unit may further include a Joint Photographic Experts Group (JPEG) encoder which converts the compressed MPEG data into YCC data and compresses the YCC data into JPEG data.

According to another aspect of the present invention, there is provided a method of processing continuous image data captured by a digital image processor, the method including compressing the continuous image data into video data in consideration of correlations between neighboring images; and converting the compressed video data into displayable data.

The compressing of the continuous image data may include converting the continuous image data into YCrCb (YCC) data; and compressing the YCC data into Moving Picture Expert Group (MPEG) data in consideration of correlations between neighboring images.

The converting of the compressed video data may include decoding the compressed MPEG data; and processing the decoded data into a displayable signal.

Each of a plurality of frames of the continuous image data may be displayed as a still image.

The method may further include, if a user deletes a selected frame when the continuous image data is displayed, performing pseudo delete such that delete is only marked on a header of the selected frame and the selected frame is not actually deleted.

The method may further include converting the compressed MPEG data into YCC data and compressing the YCC data into Joint Photographic Experts Group (JPEG) data.

BRIEF DESCRIPTION OF THE DRAWINGS

The above and other features and advantages of the present invention will become more apparent by describing in detail exemplary embodiments thereof with reference to the attached drawings in which:

FIG. 5 is examples of images for describing a method of editing continuous image data captured by the apparatus illustrated in FIG. 3, according to an embodiment of the present invention;

FIG. 9 is examples of images for describing a conventional image compression method.

DETAILED DESCRIPTION OF THE INVENTION

Hereinafter, the present invention will be described in detail by explaining embodiments of the invention with reference to the attached drawings.

Figure 1:
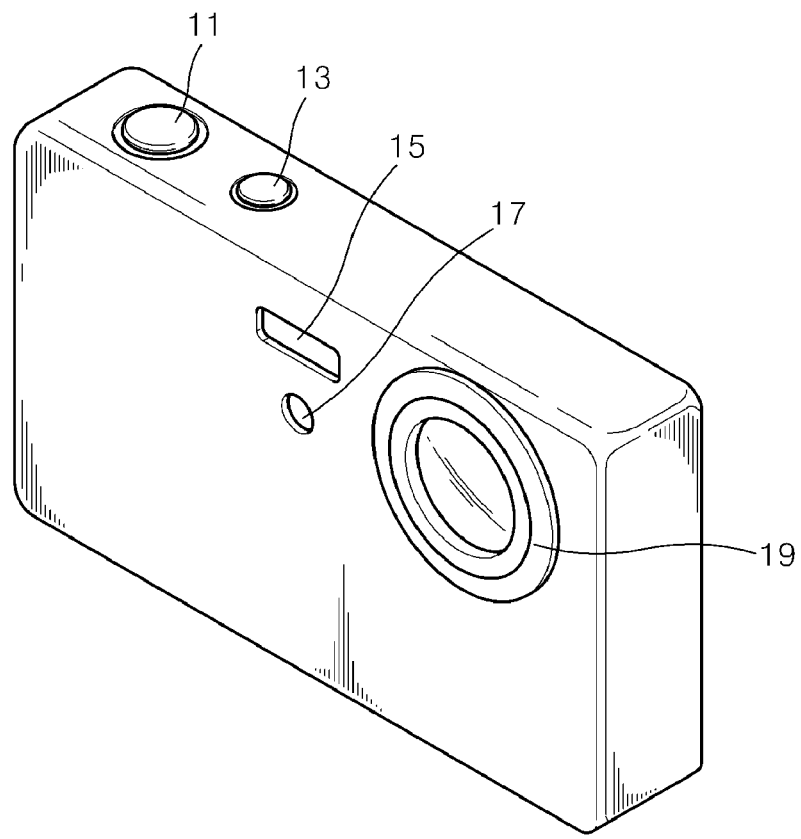
FIG. 1 is a perspective view of an example of a digital image processor according to an embodiment of the present invention.

FIG. 1 is a perspective view of a digital image processor according to an embodiment of the present invention.

Referring to FIG. 1, a shutter-release button 11 opens or shuts an iris (not shown) such that a charge-coupled device (CCD) (not shown) or a film (not shown) is exposed to light for a predetermined period of time and a subject is recorded on the CCD as an image.

The shutter-release button 11 creates first and second image capture signals based on a user's input. When the shutter-release button 11 inputs a half-release signal as the first image capture signal, the digital image processor focuses on the subject and controls the amount of light. In this case, if the digital image processor is in focus, a green light is turned on. After that, the shutter-release button 11 inputs a full-release signal as the second image capture signal so as to capture the image.

A power button 13 provides power to the digital image processor so as to operate the digital image processor.

A flash 15 instantly flashes bright light in a dark place so as to illuminate the subject. Flash modes include an automatic flash mode, a flash on mode, a flash off mode, a red-eye reduction mode, a slow synchro mode, etc.

An auxiliary light source 17 provides light to the subject when the amount of light is not sufficient or when the subject is photographed at night, so that the digital image processor can easily and accurately focus on the subject.

A lens unit 19 receives light from an external light source and processes the image.

Figure 2:
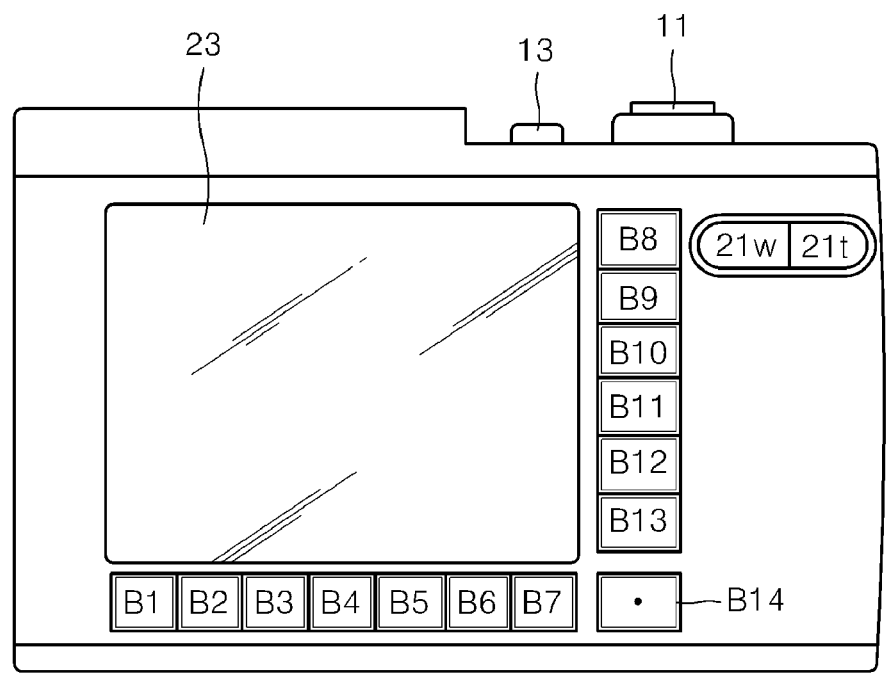
FIG. 2 is a rear view of the digital image processor illustrated in FIG. 1, according to an embodiment of the present invention.

FIG. 2 is a rear view of the digital image processor illustrated in FIG. 1, according to an embodiment of the present invention.

Referring to FIG. 2, the digital image processor includes a wide-zoom button 21w, a tele-zoom button 21t, a display unit 23, and a plurality of input buttons B1 through B14 (hereinafter referred to as buttons B1 through B14).

The wide-zoom button 21w or the tele-zoom button 21t widens or narrows a viewing angle and is used to change a size of a selected exposure area. The wide-zoom button 21w is used to reduce the size of the selected exposure area and the tele-zoom button 21t is used to increase the size of the selected exposure area.

The buttons B1 through B14 are horizontally and vertically arranged adjacent to each other on sides of the display unit 23 and respectively include touch sensors (not shown) or contact-point switches (not shown).

In more detail, if the buttons B1 through B14 respectively include touch sensors, a main menu such as a color menu or a brightness menu may be selected or a sub-menu corresponding to the main menu may be activated, by touching and sliding on the buttons B1 through B14.

Otherwise, if the buttons B1 through B14 respectively include the contact-point switches, a main menu or a sub-menu may be directly selected so as to execute a function corresponding to the main menu or the sub-menu. The touch sensors require relatively weak touches in comparison to the contact-point switches.

Figure 3:
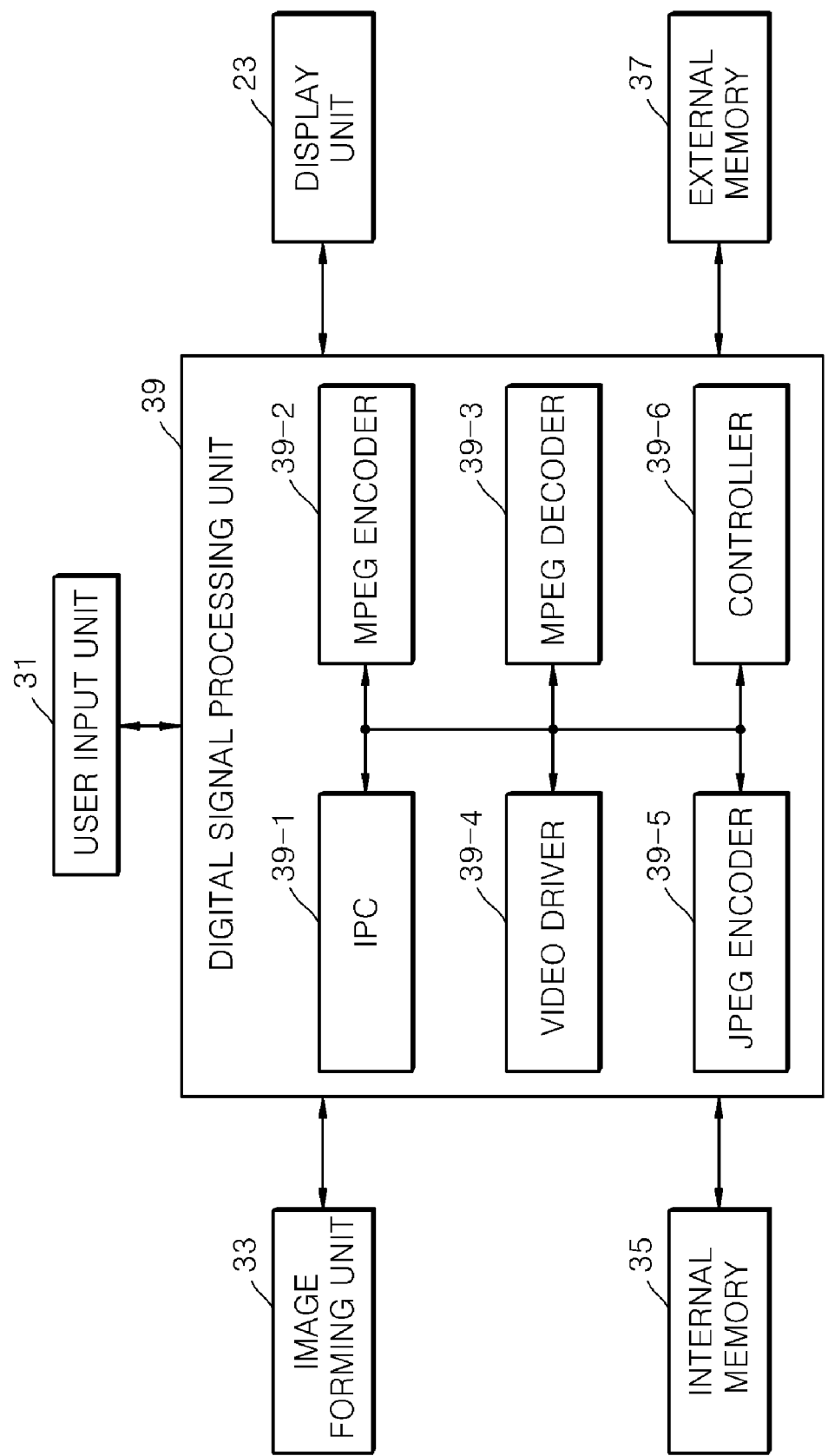
FIG. 3 is a block diagram of an example of an apparatus for processing continuous image data captured by a digital image processor, according to an embodiment of the present invention.

FIG. 3 is a block diagram of an example of an apparatus for processing continuous image data captured by a digital image processor, according to an embodiment of the present invention. FIG. 3 will be described in conjunction with FIGS. 1 and 2.

Referring to FIG. 3, the apparatus includes the display unit 23, a user input unit 31, an image forming unit 33, an internal memory 35, an external memory 37, and a digital signal processing unit 39.

The user input unit 31 includes the shutter-release button 11 that opens or shuts an iris (not shown) such that a CCD (not shown) or a film (not shown) is exposed to light for a predetermined period of time, the power button 13 that provides power, the wide-zoom button 21w or the tele-zoom button 21t that widens or narrows a viewing angle, and the buttons B1 through B14 that are horizontally and vertically arranged adjacent to each other on sides of the display unit 23 and respectively include touch sensors (not shown) or contact-point switches (not shown).

The image forming unit 33 includes a shutter (not shown), the lens unit 19, the iris, the CCD or a complementary metal-oxide semiconductor (CMOS) (not shown), and an analog-to-digital converter (ADC) (not shown). The shutter and the iris control the amount of light to which the CCD or the CMOS is exposed. The lens unit 19 receives light from an external light source and processes an image. In this case, the amount of incident light is controlled based on a degree that the iris is open, as controlled by the digital signal processing unit 39.

The CCD or the CMOS accumulates light received by the lens unit 19 and outputs an image captured by the lens unit 19 according to the amount of accumulated light, in accordance with a vertical synchronization signal. The digital image processor captures an image by using the CCD that converts light reflected from a subject into an electric signal. A color filter is required to obtain a color image by using the CCD or the CMOS and a color filter array (CFA) filter (not shown) is mainly used as the color filter. The CFA filter passes light of only one color through each pixel, has a regular arrangement structure, and has various types according to the arrangement structure. The ADC converts an analog image signal output from the CCD or the CMOS into a digital signal.

The digital signal processing unit 39 may be configured to compress image data generated by the image forming unit 33 into MPEG data using correlations between neighboring images. The digital signal processing unit 39 may be further configured to convert the MPEG data into displayable data, and to convert the MPEG data into YCrCb (YCC) data. The digital signal processing unit 39 may be further configured to compress YCC data into Joint Photographic Experts Group (JPEG) data and to transmit JPEG data to an external device. In an embodiment, the digital signal processing unit 39 includes an image processing chain (IPC) 39-1, an MPEG encoder 39-2, an MPEG decoder 39-3, a video driver 39-4, a JPEG encoder 39-5, and a controller 39-6.

Three methods may be used by the digital image processor to process the image data. First a method of compressing the images generated by the image forming unit 33 into MPEG images. Second, a method of decoding and displaying MPEG images. And, third, a method of converting MPEG images into JPEG images and then transmitting the JPEG images.

First, the method of compressing images into MPEG images when the images are captured will be described.

The IPC 39-1 performs a series of processes so as to convert Bayer Raw data that is converted into digital data and is input from the image forming unit 33, into YCC data.

The YCC data converted by the IPC 39-1 is stored in the internal memory 35 by the control of the controller 39-6. In a continuous shooting, #1 YCC data, #2 YCC data, ..., and #n YCC data are stored in the internal memory 35.

The MPEG encoder 39-2 encodes the YCC data stored in the internal memory 35 into MPEG data. The MPEG encoder 39-2 may include various modules such as a motion estimation module (not shown), a motion compensation module (not shown), a discrete cosine transformation (DCT) module (not shown), and a variable length coding (VLC) module (not shown). The motion estimation module searches for a previous frame stored in the internal memory 35, for a macroblock that is the most similar to a macroblock of a current frame, and uses the macroblock of the previous frame as a motion vector. The motion compensation module calculates a residual image between the macroblock of the current frame and the macroblock of the previous frame, which is found by the motion estimation module. The DCT module divides an image into areas having a predetermined size in a positive direction, performs transformation on each area, and thus splits each area into various frequency components, from an average (DC) frequency component to the highest frequency component. The VLC module applies a new code system between the MPEG encoder 39-2 and the MPEG decoder 39-3 by allocating a code having a short length to a frequency component having a high possibility to occur and allocating a code having a long length to a frequency component having a low possibility to occur, thereby reducing an average code length.

The greatest difference between a conventional JPEG method for compressing still images and an MPEG method according to the present invention is that the motion estimation module and the motion compensation module are included. Since the MPEG method encodes images by analyzing the differences between neighboring images, a digital image processor having a high continuous shooting performance may have a higher compression performance by using the MPEG method in comparison to when the JPEG method is used. This may permit the continuous shooting performance of the digital image processor to be improved.

The MPEG data encoded by the MPEG encoder 39-2 may be initially stored in the internal memory 35 and then stored in the external memory 37, by the control of the controller 39-6. The external memory 37 may be a module for storing encoded images, e.g., a secure digital (SD) card or a compact flash (CF) card. When data is stored in the internal memory 35 and the external memory 37, the data may be stored in a general MPEG format or other format.

The method of decoding and displaying compressed MPEG images will now be described.

When a user displays captured images, the captured images may be displayed by using the same method used when conventional JPEG images are displayed. However, a difference is that each single JPEG image is displayed according to a conventional JPEG image display method, while according to the present invention, an image desired by the user may be displayed from among continuous MPEG images.

In an embodiment, when the user displays continuous images, the controller 39-6 reads MPEG data from the external memory 37 and transmits the MPEG data to the internal memory 35.

The MPEG decoder 39-3 decodes and converts the MPEG data stored in the internal memory 35 into #1 YCC data, #2 YCC data, . . . , and #n YCC data.

The video driver 39-4 processes an image selected by the user into a displayable signal, and outputs the displayable signal to the display unit 23.

Screennail images that are generally used in JPEG data may be included in the MPEG data in order to promptly respond to the selection of the user.

Figure 4:
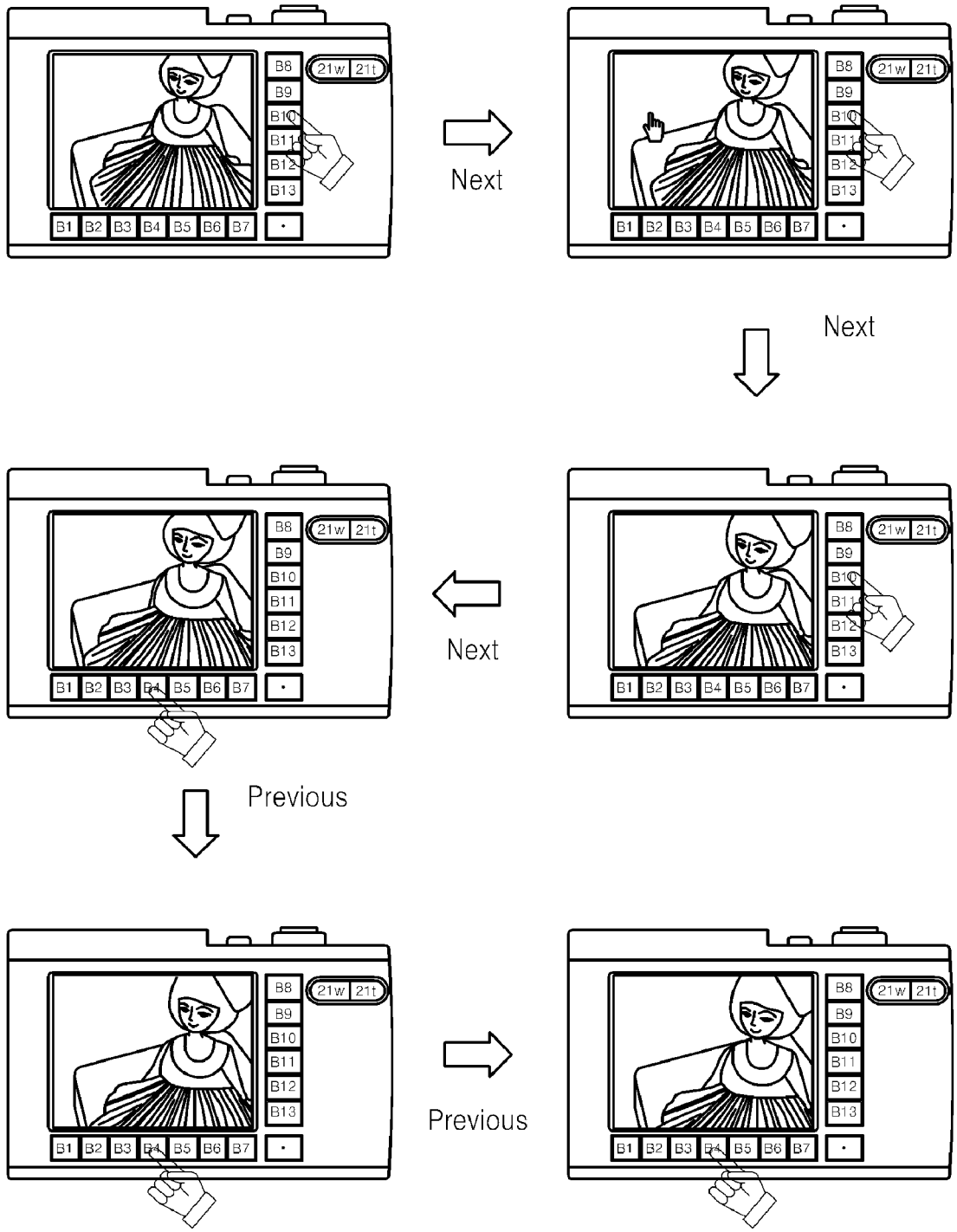
FIG. 4 is a diagram for describing an example of a method of displaying continuous image data captured by the apparatus illustrated in FIG. 3, according to an embodiment of the present invention.

FIG. 4 is a diagram for describing a method of displaying continuous image data captured by the apparatus illustrated in FIG. 3, according to an embodiment of the present invention.

Referring to FIG. 4, unlike conventional continuous images that are displayed as a video image, the captured images are still images and thus are displayable as still images in response to a selection by a user. In other words, each frame of continuous images may be displayed as a still image.

FIG. 5 is images for describing a method of editing continuous image data captured by the apparatus illustrated in FIG. 3, according to an embodiment of the present invention. A case when a user deletes one of the continuous images will be described with reference to FIG. 5.

Referring to FIG. 5, if the user deletes, for example, frame #4 from among the continuous images, it takes time to delete frame #4 and to recompress the continuous images, because the compression may have depended on frame #4 Thus, pseudo delete is performed such that delete is only marked on a header of frame #4 and frame #4 is not actually deleted. When image data including a frame on which delete is marked is displayed, the frame is only decoded and is not displayed on the display unit 23 illustrated in FIG. 3.

Referring back to FIG. 3, lastly, the method of compressing compressed MPEG images into JPEG images and transmitting the JPEG images will now be described.

When a user transmits image data stored in the external memory 37 to, for example, a personal computer (PC) (not shown), the image data may need to be converted into JPEG data.

The controller 39-6 reads MPEG data from the external memory 37 and transmits the MPEG data to the internal memory 35.

The MPEG decoder 39-3 decodes and converts the MPEG data stored in the internal memory 35 into #1 YCC data, #2 YCC data, . . . , and #n YCC data.

The JPEG encoder 39-5 compresses #1 YCC data, #2 YCC data, . . . , and #n YCC data output from the MPEG decoder 39-3 into JPEG data and transmits the JPEG data to the external memory 37 or the PC through the internal memory 35.

Figure 6:
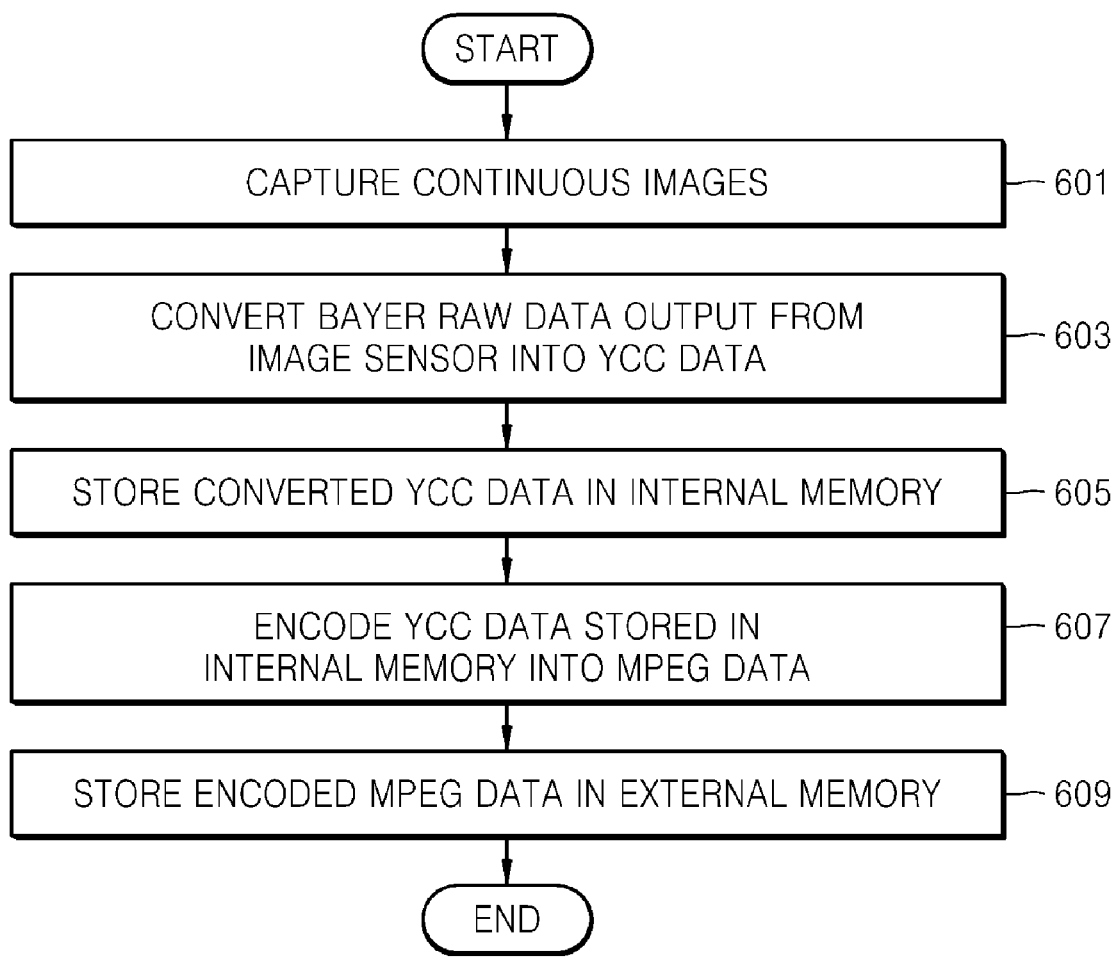
FIG. 6 is a flowchart of an image capturing method for describing an example of a method of processing continuous image data captured by a digital image processor, according to an embodiment of the present invention.
Figure 7:
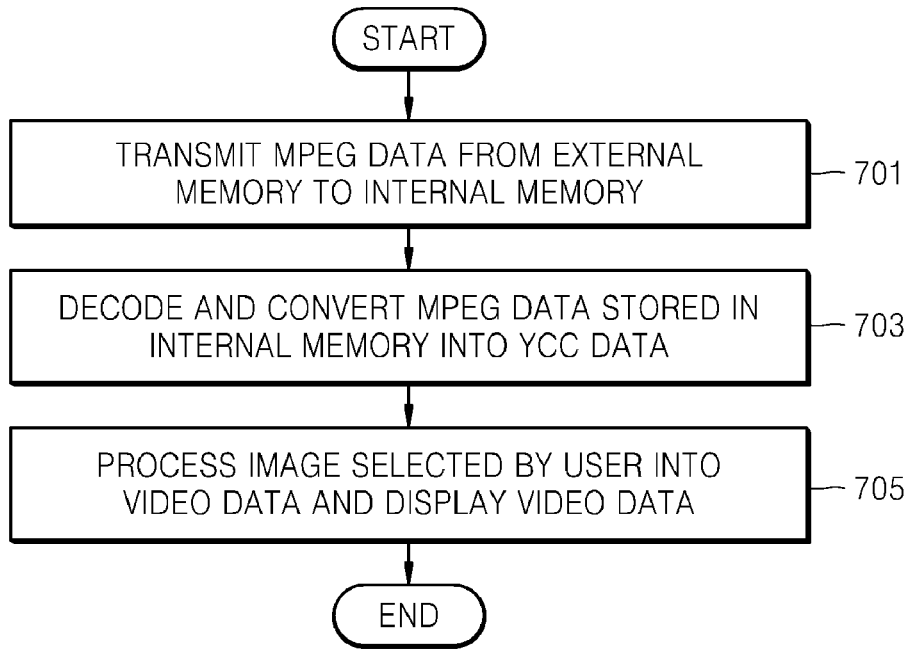
FIG. 7 is a flowchart of an example of an image display method for describing a method of processing continuous image data captured by a digital image processor, according to an embodiment of the present invention.
Figure 8:
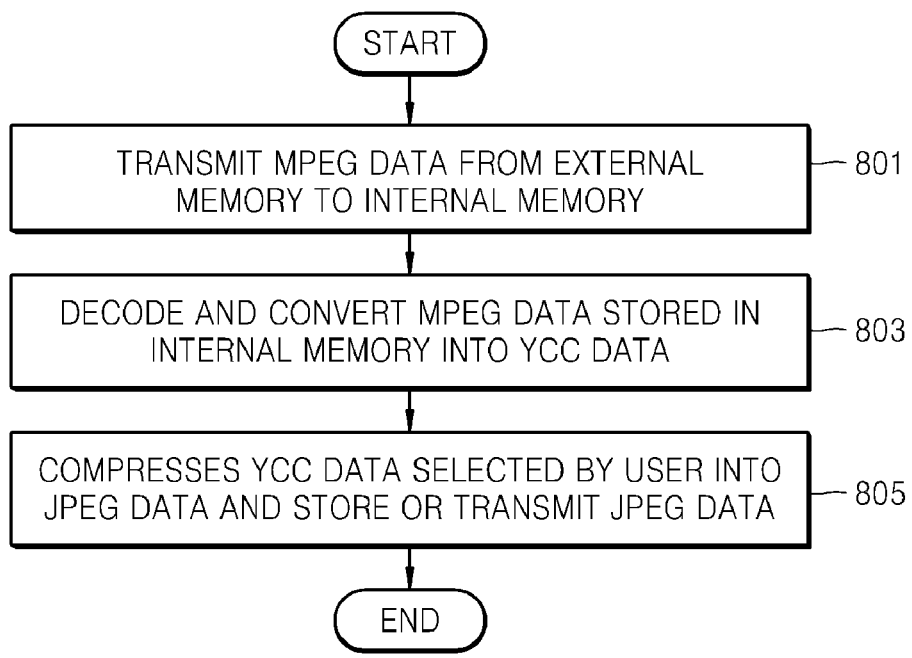
FIG. 8 is a flowchart of an example of an image transmission method for describing a method of processing continuous image data captured by a digital image processor, according to an embodiment of the present invention.

FIGS. 6 through 8 are flowcharts of an image capturing method, an image display method, and an image transmission method, respectively, for describing a method of processing continuous image data captured by a digital image processor, according to an embodiment of the present invention. The method of processing continuous image data captured by a digital image processor may be performed by the apparatus illustrated in FIG. 3 and a method may be performed by the digital signal processing unit 39 illustrated in FIG. 3 with the aid of other elements included in the apparatus. FIGS. 6 through 8 will be described in conjunction with FIG. 3

Initially, the image capturing method will now be described with reference to FIG. 6.

When a user captures continuous images, in operation 601, the digital signal processing unit 39 converts Bayer Raw data output from an image sensor of the image forming unit 33 to YCC data, in operation 603.

The digital signal processing unit 39 stores the converted YCC data in the internal memory 35, in operation 605. Since the continuous images are captured, #1 YCC data, #2 YCC data, . . . , and #n YCC data are stored in the internal memory 35.

The digital signal processing unit 39 encodes the YCC data stored in the internal memory 35 into MPEG data, in operation 607. Motion estimation, motion compensation, DCT, VLC, etc., are performed to encode the YCC data into MPEG data. Detailed descriptions thereof have been made above with reference to FIG. 3 and thus will be omitted.

A large difference between a conventional JPEG method for compressing still images and an MPEG method according to the present invention is that motion estimation and motion compensation are performed in MPEG. Since the MPEG method encodes images by analyzing the differences between neighboring images, a digital image processor having a high continuous shooting performance may have a higher compression performance by using the MPEG method in comparison to when the JPEG method is used.

The digital signal processing unit 39 stores the encoded MPEG data in the external memory 37 through the internal memory 35, in operation 609. When data is stored in the internal memory 35 and the external memory 37, the data may be stored in a general MPEG format or a particular file format.

The image display method will now be described with reference to FIG. 7.

When a user displays captured images, the captured images may be displayed by using the same method used when conventional MPEG images are displayed. However, a difference is that images are continuously displayed according to a conventional MPEG image display method while an image desired by the user may be displayed according to the present invention.

When the user displays continuous images, the digital signal processing unit 39 reads MPEG data from the external memory 37 and transmits the MPEG data to the internal memory 35 in operation 701.

The digital signal processing unit 39 decodes and converts the MPEG data stored in the internal memory 35 into #1 YCC data, #2 YCC data, . . . , and #n YCC data, in operation 703.

The digital signal processing unit 39 processes an image selected by the user into a displayable signal, and outputs the displayable signal to the display unit 23, in operation 705.

Screennail images that are generally used in JPEG data may be included in the MPEG data in order to promptly respond to the selection of the user.

As shown in FIG. 4, although images are continuously captured, the captured images are still images and thus may be displayed as still images. In contrast, conventional digital image processors display continuously captured images as a video image from the first image to the last image.

As shown in FIG. 5, if the user deletes, for example, frame #4 from among the continuous images, it takes time to delete frame #4 and to recompress the continuous images. Thus, pseudo delete is performed such that delete is only marked on a header of frame #4 and frame #4 is not actually deleted. When image data including a frame on which delete is marked is displayed, the frame is only decoded and is not displayed on the display unit 23.

Lastly, the image transmission method will now be described with reference to FIG. 8.

When a user transmits image data stored in the external memory 37 to, for example, a PC (not shown), the image data has to be converted into JPEG data.

The digital signal processing unit 39 reads MPEG data from the external memory 37 and transmits the MPEG data to the internal memory 35, in operation 801.

The digital signal processing unit 39 decodes and converts the MPEG data stored in the internal memory 35 into #1 YCC data, #2 YCC data, . . . , and #n YCC data, in operation 803.

The digital signal processing unit 39 compresses #1 YCC data, #2 YCC data, . . . , and #n YCC data, which are converted by the selection of the user, into JPEG data and transmits the JPEG data to the external memory 37 or the PC through the internal memory 35, in operation 805.

As described above, according to the present invention, a plurality of continuous images may be encoded/decoded in an MPEG format by using correlations between neighboring frames and thus compression efficiency may be improved.

Embodiments comprise a computer readable medium encoded with computer-executable instructions to perform the methods described above. The computer readable medium includes RAM memory, flash memory, ROM memory, EPROM memory, EEPROM memory, registers, a hard disk, a removable disk, a CD-ROM, or other forms of computer readable media known in the art.

For convenience, in the description above, the functionality described has been divided into a number of units; however, the number of units may vary and the functionality described above may be differently divided among the units, or the functionality described above may be implemented without units. The various illustrative units described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors one or more microprocessors in conjunction with a DSP core, or any other such configuration.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for processing continuous image data captured by a digital image processor, comprising:
   a digital signal processing unit
      configured to compress the continuous image data using correlations between neighboring images,
      configured to compress screennail images of the continuous image data independently of the correlations and include the independently compressed screennail images in the compressed continuous image data using the correlations, and
      configured to convert the compressed continuous image data into displayable data.

2. The apparatus of claim 1, wherein the digital signal processing unit comprises:
   a data converter configured to convert the continuous image data into YCrCb (YCC) data;
   a Moving Picture Expert Group (MPEG) encoder configured to compress the YCC data into MPEG data using correlations between neighboring images;
   an MPEG decoder configured to decode the compressed MPEG data; and
   a video driver configured to process the decoded data into a displayable signal.

3. The apparatus of claim 2, wherein the video driver is configured to display a plurality of frames of the continuous image data as a still image.

4. The apparatus of claim 3, wherein the apparatus is further configured to pseudo delete an image in response to a user selecting delete of a frame when the continuous image data is displayed, wherein pseudo delete is performed such that delete is only marked on a header of the selected frame and the selected frame is not actually deleted.

5. The apparatus of claim 2, wherein the digital signal processing unit further comprises:
   a Joint Photographic Experts Group (JPEG) encoder configured to convert the compressed MPEG data into YCC data and to compress the YCC data into JPEG data.

6. A method of processing continuous image data captured by a digital image processor, the method comprising:
    compressing the continuous image data using correlations between neighboring images;
    compressing screennail images of the continuous image data independently of the correlations and including the independently compressed screennail images in the compressed continuous image data using the correlations; and
    converting the compressed continuous image data into displayable data.

7. The method of claim 6, wherein the compressing of the continuous image data comprises:
    converting the continuous image data into YCrCb (YCC) data; and
    compressing the YCC data into Moving Picture Expert Group (MPEG) data using correlations between neighboring images.

8. The method of claim 6, wherein the converting of the compressed continuous image data comprises:
    decoding the compressed MPEG data; and
    processing the decoded data into a displayable signal.

9. The method of claim 6, wherein a plurality of frames of the continuous image data is displayed as a still image.

10. The method of claim 9, further comprising, responsive to a delete request of a frame from a user, performing a pseudo delete such that delete is only marked on a header of the frame and the frame is not actually deleted.

11. The method of claim 8, further comprising converting the compressed MPEG data into YCC data and compressing the YCC data into Joint Photographic Experts Group (JPEG) data.

* * * * *